United States Patent Office 3,067,170
Patented Dec. 4, 1962

3,067,170
PROCESS FOR PREPARING HIGH MOLECULAR WEIGHT EPOXY-CONTAINING PRODUCTS FROM LOWER MOLECULAR WEIGHT POLYEPOXIDES
James E. Carey, Maplewood, N.J., assignor to Shell Oil Company, a corporation of Delaware
No Drawing. Filed Jan. 29, 1958, Ser. No. 711,797
7 Claims. (Cl. 260—47)

This invention relates to new epoxy-containing materials. More particularly, the invention relates to a new process for preparing high molecular weight soluble epoxy-containing mateirals from lower molecular weight polyepoxides, and to the resulting products.

Specifically, the invention provides a new and highly efficient process for preparing solid high molecular weight acetone-soluble epoxy-containing material from lower molecular weight polyepoxides. This process comprises heating at a temperature between 50° C. and 300° C. a solution comprising a polyepoxide having a

equivalency greater than 1.0 with not more than 5% by weight of a Lewis acid, continuing the heating until the viscosity of the mixture (as determined by Brookfield Viscosity) has increased preferably at least 3 times that of the original mixture but not sufficient to cause gelation, and then stopipng the reaction, such as, for example, by rapid cooling. The invention also provides valuable high molecular weight epoxy-containing products prepared by this process.

Known low molecular weight polyepoxides, such as glycidyl ethers of bis-phenol-A, can be cured to form products having good strength and chemical resistance. These products, however, are not particularly suitable for use in making molding powders because of their liquid nature. The volatility of many of the low molecular weight epoxy compounds also limits their usefulness in many applications. The currently available higher linear polyepoxides are not particularly suitable for use in making molding powders because on cure they do not develop sufficient elevated temperature strength.

It is an object of the invention, therefore, to provide new epoxy-containing products. It is a further object to provide new high molecular weight epoxy-containing products that can be prepared from lower molecular weight polyepoxides. It is a further object to provide a new class of high molecular weight epoxy-containing materials that can be used to prepare improved molding powders. It is a further object to provide new high molecular weight epoxy-containing materials that are particularly suited for use in making molding powders that can be cured to form products having excellent elevated temperature strength. It is a further object to provide new epoxy materials that have low shrinkage on cure. It is a further object to provide new epoxy materials that have a low order of toxicity. Other objects and advantages of the invention will be apparent from the following detailed description thereof.

It has now been discovered that these and other objects may be accomplished by the solid high molecular weight epoxy-containing products of the invention which are prepared by heating at a temperature between 50° C. and 200° C. a solution comprising a polyepoxide having a

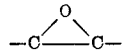

equivalency greater than 1.0 with not more than 5% by weight of a Lewis acid, continuing the heating until the viscosity of the mixture (as determined by the Brookfield Viscosity) has increased preferably to at least 3 times that of the original mixture but not sufficient to cause gelation, and then stopping the reaction, such as, for example, by rapid cooling. The new high molecular weight products prepared by this method are relatively non-toxic epoxy-containing solid products which are still soluble and still fusible. They can be cured by heat alone or by addition of epoxy curing agents to form cured products which are extremely hard and have excellent elevated temperature strength. Further, the products have very little shrinkage on cure. The new products are especially useful for making molding powders and laminates.

The polyepoxide materials to be used in preparing the new condensates of the present invention comprise those organic materials mhich have more than one vic-epoxy group, i.e. more than one

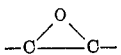

groups, which group may be in a terminal position, i.e. a

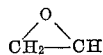

group, or in an internal position, i.e. a

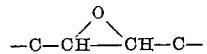

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (bis-phenol-A), 2,2-bis(4-hydroxyphenyl)butane, 4,4'-dihydroxybenzophenone, bis(4-hydroxyphenyl)ethane, 2,2-bis(4-hydroxyphenyl)-pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epi one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of two of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

*Polyether A.*—About 2 moles of 2,2-bis(4-hydroxyphenol)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50. For convenience this product will be referred to hereinafter as Polyether A.

*Polyether B.*—A solution consisting of 11.7 parts of water, 1.22 parts of sodium hydroxide and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides comprises the polyepoxy polyethers obtained by reacting, preferably in the presence of an acid-acting compound, such as hydrofluoric acid, one of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inisitol, trimethylolpropane, bis(4-hydroxycyclohexyl)dimethylmethane and the like.

The preparation of one of these polyepoxide polyethers may be illustrated by the following:

PREPARATION OF GLYCIDYL POLYETHERS OF POLYHYDRIC ALCOHOLS

*Polyether C.*—About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amounts of 261 parts, was a pale yellow viscous liquid. It has an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether C.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Examples of polyepoxides having internal epoxy groups include among others, the epoxidized esters of polyethylenicaly unsaturated monocarboxylic acids, such as epoxidized linseed, soybean, perilla, oiticica, tung, walnut and dehydrated castor oil, methyl linoleate, butyl linolenate, ethyl 9,12-octadecadienoate, butyl 9,12,15-octadecatrienoate, ethyl elaestearate, octyl 9,12-octadecadienoate, methyl elaeostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5 - epoxydodecyl)maleate, di (2,3 - epoxybutyl)terephthalate, di(2,3-epoxypentyl)thiodipropionate, di(2,3-epoxybutyl)citrate, and di(4,5-epoxyoctadecyl)malonate, as well as the esters of epoxycyclohexanol and epoxycyclohexylalkanols, such as 2,3-epoxycyclohexylmethanol, and polycarboxylic acids, such as, for example, di(2,3-epoxycyclohexylmethyl)adipate and di(2,3-epoxycyclohexylmethyl)phthalate.

Another group of materials having internal epoxy groups include epoxidized esters of unsatural alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl, 4,5-epoxyoctanoate and the like.

Another group of materials having internal epoxy groups includes epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6 - diepoxycyclohexane - dicarboxylate, dibenzyl 1,2,4,5-diepoxycyclohexane-1,2-dicarboxylate and diethyl 5,6-, 10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The material to be reacted with the polyepoxides comprises acidic material known as Lewis acids, such as, for example, Friedel-Crafts catalyst as the metal and metalloid halides as aluminum chloride, aluminum bromide, ferric chloride, zinc chloride, stannic chloride, titanium tetrachloride, and the like, as well as boron trifluoride and addition boron products of $BF_3$ and other materials. By far the more preferred activators, particularly because of the superior increase in rate of reaction obtained therewith, are the addition products of $BF_3$ and materials such as amines and phenols. The phenolic compounds may be mono- or polynuclear and mono- or polyhydric, such as, for example, phenol, bis-phenol, resorcinol, catechol, 2,2-bis(4-hydroxyphenyl)butane and the like. The nitrogen compound can be, for example, a primary, secondary or tertiary aliphatic amine, such as methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylenediamine, triethylenetetraamine, tetraethylenepentamine, aminoethylethanolamine, etc.; aromatic amines, such as o-phenylenediamine, m-phenylenediamine, p-phenylenediamine, o-toluidine, m-toluidine, p-toluidine, benzylamine, methylaniline, diphenylamine, triphenylamine, etc., pyridine, compounds having condensed pyridine rings, and their homologs and other derivatives, for example, alpha-picoline, beta-picoline, gamma-picoline, the lutidines, such as 2,6-lutidine, the collidines, 2-ethanolpyridine, 4-ethanolpyridine, 2-hexylpyridine, 2-propanolpyridine, 4-propanolpyridine, 2-vinylpyridine, quinoline, isoquinoline, quinaldine, lepidine, etc., aminopyridines and homologs thereof, for example, 2-amino-3-methylpyridine, 2-amino-6-methylpyridine, 2-aminopyridine, etc.; cycloalkylamines, for example, cyclohexylamine, and dicyclohexylamine; piperidines; etc.

Also useful are the $BF_3$ addition products with ethers, glycols and monohydric alcohols, such as $BF_3$-ethyl ether, $BF_3$-ethylene glycol and $BF_3$-ethyl alcohol.

The $BF_3$ addition products may be prepared by conventional methods. The $BF_3$-amines, for example, may be prepared by passing $BF_3$ gas over or into a solution containing the amine, or they may be prepared by adding the amine dropwise to a reaction flask containing $BF_3$-etherate and excess ether while keeping the mixture at a temperature of about 35° C. and after the reaction has subsided, removing the excess ether.

The preparation of some of the $BF_3$-amines is shown below.

$BF_3$-Triethyl Amine

One mole of triethyl amine was added dropwise with stirring to a solution of 1 mole of $BF_3$ etherate diluted with excess diethyl ether at −20° C. The addition complex crystallized out of solution and was separated by filtration and washed with cold ether.

$BF_3$-Dimethyl Benzene Amine

Thirty-four parts of dimethyl benzene amine was dissolved in 25 parts of petroleum ether and agitated while $BF_3$ gas was passed over the surface. The temperature was kept below 15° C. by cooling. After four hours, 21.5 parts of a white powder were recovered by filtration.

$BF_3$-Dimethyl Aniline 60.5 g. (½ mol) of dimethyl aniline was stirred at a temperature of 10–20° C. while $BF_3$ gas was intermittently passed over the surface for 4½ hours. The resulting solid complex had a light green color.

$BF_3$-Ethyl Aniline $BF_3$ gas was bubbled into ethyl aniline at room temperature. When the $BF_3$ gas began to be given off in copious quantities, the addition was stopped and light vacuum applied. Resulting product was a viscous liquid complex of $BF_3$ and ethyl aniline.

$BF_3$-Trimethyl Amine

Five parts of trimethyl amine were condensed in 110 50 g. of petroleum ether (B.P. 25–65° C.). $BF_3$ gas was added to this solution at a temperature below 6° C. until addition of further $BF_3$ resulted in no temperature rise. The white solid which had formed was filtered on a Buchner Funnel and washed with cold petroleum ether.

$BF_3$-Tripropyl Amine 72.5 g. (½ mol) of tripropyl amine were dissolved in 50 g. of petroleum ether (B.P. 25–65° C.) $BF_3$ gas was passed intermittently over the surface of the solution, which was agitated and cooled externally with ice to keep the temperature down below 6° C. After three hours, the white crystalline solid was filtered off, washed twice with petroleum ether and air dried.

$BF_3$-Lauryl Amine 185 parts of lauryl amine was dissolved in 100 parts of toluene and treated with $BF_3$ gas at a temperature below 13° C. The complex was precipitated by the addition of petroleum ether.

$BF_3$-Ammonia 200 parts of $BF_3$-diethyl ether complex (45 percent $BF_3$) and 200 parts of diethyl ether were agitated in a container and $NH_3$ gas was passed over the surface. The product was filtered and occluded gases removed by heating at 50° C. under vacuum. The product so obtained had a melting point above 250° C.

$BF_3$-Phenylhydrazine 75 parts of phenylhydrazine was dissolved in 200 parts of benzene and $BF_3$ gas was passed through until the reaction was complete. A white solid was recovered as the product.

$BF_3$-Hexanolamine 50 parts of hexanolamine was placed in 200 parts of benzene. Boron trifluoride gas was passed through the solution with stirring until the reaction was complete. The crude product was a sticky material resembling diethylenetriamine-boron trifluoride in its appearance. The hexanolamine-boron trifluoride is soluble in butyl "Carbitol," acetone, methyl ethyl ketone, and water.

$BF_3$-Diethylene Triamine 151 parts (1 mole) of boron trifluoride-ether solution was placed in 200 parts of diethyl ether. 34 parts (½ mole) of diethylenetriamine in 70 parts of diethyl ether was then added slowly. The product separated as a gummy mass which became hard after the solvent escaped by air drying. The product was soluble in pyridine, methyl "Cellosolve," and water, being difficultly soluble in alcohol and methyl ethyl ketone. It could not be recrystallized. The melting point of the crude material was above 200° C.

$BF_3$-n-Butyl Amine 75 parts (½ mole) of boron trifluoride ether complex was added to 150 parts of diethyl ether. A soluttion of 36.5 parts of mono-n-butyl amine in 100 parts of diethyl ether was then very gradually added to this mixture with continued stirring. Upon filtering and drying, a white crystalline product was obtained.

$BF_3$-Amylamine 87 parts (one mole) of amyl amine was dissolved in 200 parts of diethyl ether and 151 parts (one mole) of boron trifluoride-ether complex was added thereto very gradually with stirring. The solution was cooled and filtered and a white crystalline product was obtained.

$BF_3$-Decylamine 75 parts (½ mole) of $BF_3$-ether complex was added to 150 parts of diethyl ether, and a solution of 78 parts (1 mole) of decyl amine in 100 parts of diethyl ether was added thereto with stirring. On cooling and filtering, a yellow solid wax was obtained.

$BF_3$-Aniline 100 parts of aniline dissolved in 400 parts of benzene were placed in a 1-liter round bottom flask. Dry boron trifluoride gas was bubbled into the benzene solution, and the resulting crystals removed by filtration.

$BF_3$-Morpholine

Eighty-seven parts (1 mole) of morpholine was stirred while 151 parts (1 mole) of a $BF_3$-ether complex (45 percent $BF_3$) in 100 parts of ethyl ether was added dropwise. On cooling the reaction mixture, an orange-yellow solid separated. The complex was washed with dry ethyl ether. It was insoluble in methyl ethyl ketone.

$BF_3$-Benzyl Aniline

To a solution of 286 parts of benzyl aniline in 155 parts of anhydrous ether was added dropwise 200 parts of $BF_3$-ether complex (45 percent $BF_3$). The yellow precipitate was separated by filtration. This complex melted at 125–155° C. with decomposition.

$BF_3$-Pyridine

Sixty-nine parts (1 mole) of pyridine was stirred while 151 parts (1 mole) of $BF_3$-ether complex was added dropwise. The reaction was exothermic and the reaction mixture was cooled to aid precipitation of the complex. The white crystals which separated were collected on a filter and air dried.

Methods for preparing other $BF_3$ derivatives may be found in "Boron Trifluoride and Its Derivatives"—Booth and Martin (N.Y., Wiley 1949).

The novel prepolymers of the present invention are prepared by heating the above-described polyepoxide with a controlled amount of the afore-described Lewis acids and then after the viscosity of the solution has increased to the desired intent, stopping the reaction.

The amounts of the polyepoxide and the Lewis acid to be employed are important. In order to obtain the soluble epoxy-containing high molecular weight product of the present invention, the polyepoxide is reacted with not more than 5% by weight of the polyepoxide of the Lewis acid. Preferably, the polyepoxide is reacted with not more than 2.5 parts (per 100 parts of polyepoxide) of the Lewis acid.

Temperatures utilized in the reaction will preferably vary from about 50° C. to 300° C. Preferred temperatures range from 100° C. to 160° C.

The reaction is preferably conducted under atmospheric pressure, but it may be advantageous in some cases to employ subatmospheric or superatmospheric pressures.

The reaction may be conducted in the presence or absence of inert solvents or diluents. In most cases, the Lewis acid and polyepoxide will be liquid and the reaction may be easily effected without the addition of solvents or diluents. However, in case the polyepoxide is a solid, diluents may be added to assist in effecting the reaction. Examples of such diluents include inert hydrocarbons as xylene, toluene, cyclohexane, and other materials as cyclohexane, and the like.

If solvents are employed in the reaction and the formed high molecular weight product is to be used for coating compositions or for making laminates, the solvent may sometimes be retained with the high molecular weight product. Otherwise, the solvent may be removed by any suitable method such as vacuum distillation and the like.

During the cook, it is also advantageous to add a polyhydric material, such as aliphatic polyols as glycerol, 1,2,6-hexanetriol, polyvinyl alcohol, pentaerythritol, polyallyl alcohol, copolymers of allyl alcohol and monomers as styrene, ethylene glycol, triethylene glycol, hexamethylene glycol and the like. These materials are preferably employed in amounts up to about 40% by weight of the polyepoxide. The products in this case have much higher mol wts.

The heating of the mixture containing the polyepoxide and Lewis acid is continued until the viscosity of the solution has increased to the desired extent and then the reaction is stopped. The increase in viscosity will be determined by the molecular weight desired as the molecular weight increases with increase in viscosity. The heating is preferably continued until the viscosity of the mixture (as determined by the Brookfield Viscometer) has increased at least 3 times that of the original mixture and preferably from 10 to 100 times and often as much as 10,000 times that of the original mixture. The heating should of course not be continued until gelation occurs. Viscosities referred to herein are Brookfield Viscosities.

After the mixture has reached the desired viscosity, the reaction is stopped. This may be accomplished by any suitable means, such, as for example, by rapidly reducing the temperature to say 20° C. or below, say by addition of large amounts of solvent as shown in the working examples, by placing in thin layers or by refrigerator means.

After the reaction is stopped, the solvent may be removed from the mixture to give the solid polymer, or the solvent may be retained and the polymer used in that form as in the formation of laminates or surface coating compositions.

The new products are solid products which are soluble in solvents such as acetone and are fusible, i.e. may be converted with continued heating to the infusible stage. This latter property is due to the presence within the polymer of the Lewis acid, and if care is taken to remove that from the solid by washing or solvent extraction, the products may then become non-heat curable. It is in many cases desirable to remove the Lewis acid and then add a dissimilar epoxy curing agent as noted below to effect the desired cure.

The new high molecular weight products may be used alone or in combination with monomeric polyepoxide, such as any of those described above for the preparation of the new products. Particularly preferred are the monomeric glycidyl polyethers of polyhydric phenols, and especially the glycidyl polyethers of polyhydric phenols having more than two phenolic OH groups, such as described in U.S. 2,806,016. These monomeric polyepoxides are preferably utilized in amounts varying from about 0.1% up to about 50% by weight of the high molecular weight material.

The new high molecular weight products may also be used in combination with other reactive materials, such as, for example, resinous polymers possessing free OH groups as hydrolized polymers and copolymers of vinyl acetate with dissimilar ethylenically unsaturated compounds, such as vinyl chloride. These materials are preferably used in amounts varying from a small amount say 0.1% up to as high or higher than 70% by weight of the new epoxy materials.

The new high molecular weight products possess epoxy groups, alone or in combination with the above-noted materials, may be cured to insoluble infusible products by reacting with known epoxy curing agents.

Examples of the curing agents include, among others, alkaline materials like sodium or potassium hydroxides; alkali phenoxides like sodium phenoxide; carboxylic acids or anhydrides, such as formic acid, oxalic acid or phthalic anhydride; dimer or trimer acids derived from unsaturated fatty acids, 1,20-eicosanedioic acid, and the like; Friedel-Crafts metal halides like aluminum chloride, zinc chloride, ferric chloride or boron trifluoride as well as complex thereof with ethers, acid anhydrides, ketones, amines, phenol and diazonium salts, etc.; salts, such as zinc fluoborate, magnesium perchlorate and zinc fluosilicate; phosphoric acid and partial esters thereof including n-butyl ortho-phosphate, diethyl ortho-phosphate hexaethyl tetraphosphate; amino compounds, such as, for example, diethylene triamine, triethylene tetramine, dicyanidiamide, melamine, pyridine, cyclohexylamine, benzyldimethylamine, benzylamine, diethylaniline, triethanolamine, piperidine, tetramethyl piperazine, N,N-diethyl-1,3-propane diamine, 1,2-diamino-2-methylpropane, 2,3-diamino-2-methylbutane, 2,4-diamino-2-methylpentane, 2,4-diamino-2,6-dimethyloctane, dibutylamine, dinonylamine, distearylamine, diallyl amine, dicyclohexylamine, ethylcyclohexylamine, o-tolylnaphthylamine, pyrrolidine, 2-methyl pyrrolidine, tetrahydropyridine, 2-methylpiperidine, 2,6-dimethylpiperidine, diaminopyridine, tetramethylpentane, metaphenylene diamine, and the like, and soluble adducts of amines and polyepoxides and their salts, such as described in U.S. 2,651,589 and U.S. 2,640,037.

Preferred curing agents are the polycarboxylic acids and acid anhydrides, the primary and secondary aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

The amount of the curing agent employed may vary widely. In general, the amount of the curing agent will vary from about 0.5% to 200% by weight of the polyepoxide. The tertiary amines and $BF_3$-complexes are preferably employed in amounts varying from about 0.5% to 20% and the metal salts are preferably employed in amounts varying from about 1% to 15%. The secondary and primary amines, acids and anhydrides are preferably employed in at least stoichiometric amounts, i.e. sufficient amount to furnish one amine hydrogen or one anhydride group for every epoxy group, and more preferably stoichiometric ratio varying from 1:1 to 25:1.

One important application of the products of the invention is the production of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas, and the like. It is useful to prepare the laminates from woven glass cloth that has been given prior treatment with well known finishing or sizing agents therefor, such as chrome methacrylate or vinyl trichlorosilane.

In preparing the laminates, the sheets of fibrous material are first impregnated with new high molecular weight epoxy-containing material and an epoxy curing agent. This is conveniently accomplished by dissolving the high molecular weight epoxy-containing material in a solvent and adding a curing agent thereto. The sheets of fibrous material are impregnated with this solution by any conventional method such as by spreading it thereon or by dipping or otherwise immersing them in the impregnant. The solvent is then conveniently removed by evaporation and the sheets then superposed and the assembly cured in a heated press under a pressure say of about 25 to 500 p.s.i. Temperatures used in the curing preferably range from about 100° F. to about 300° F. or higher. As noted hereinabove, the resulting laminate is extremely strong and has superior heat resistance.

Another important use of the invention is the production of molded articles. A molding powder is first prepared by milling together a mixture of the high molecular weight epoxy-containing material with curing agent and customary fillers and mold release agents. The milled mixture is then ground and molded articles obtained therefrom with conversion of the fusible resin into the fusible state with use of molding machines such as those for compression molding or transfer molding. If desired, fusible milled mixture may be prepared in preform pellets and the like.

The new high molecular weight epoxy-containing materials of the present invention are also useful in the preparation of surface coating compositions. In this application, the epoxy-containing material is usually mixed with one or more of suitable solvents or diluents, such as, for example, ketones, such as methyl isobutyl ketone, acetone, methyl ethyl ketone, isophorone, esters, such as ethyl acetate, Cellosolve acetate, methyl Cellosolve acetate, etc.; ethyl alcohols, such as methyl, ethyl or butyl ether of ethylene glycol or diethylene glycol, chlorinated hydrocarbons, such as trichloropropane; hydrocarbons, such as benzene, toluene, xylene and the like, to give a mixture having suitable viscosity for spraying, brushing or dipping and then the necessary curing agents may be added alone or in admixture with a suitable solvent. The cure of the coating compositions thus prepared may be preferably accomplished by the application of heat. Satisfactory cures are obtained generally with temperatures of 60° C. up to 200° C.

Additional materials may be added in the preparation of coating compositions to vary the properties. Such materials include pigments, dyes, stabilizers, plasticizers, and various bodying agents as oils, resins and tars. Materials, such as coal tars, asphalts, and the like are particularly desirable for use when the coatings are to be employed for the treatment of roadways, cement floors and the like.

The coatings prepared from the new products are characterized by their hardness, chemical resistance, heat resistance and good adhesion.

The new products are also useful in flame spraying and in preparing adhesives and hot melt castings.

The new epoxy-containing products particularly when used in combination with other materials, such as the above-noted hydrolyzed copolymers, are especially useful in the whirlclad process wherein the object to be coated is heated and dipped into a fluidized bed containing finely-divided particles of the new high molecular epoxy materials, the hydrolyzed polymer and epoxy curing agent.

The products can also be reacted with fatty acids, and preferably unsaturated fatty acids, to form resinous products useful in preparing coating compositions.

The invention is illustrated by the following examples. Unless otherwise indicated, parts are parts by weight.

EXAMPLE I

This example illustrates the preparation of a high molecular weight epoxy-containing acetone-soluble product from Polyether A described above and $BF_3$ ethylamine.

5750 parts of Polyether A was heated to 97° C. and 115 parts (2 parts phr.) of $BF_3$ ethylamine added thereto. The mixture was stirred and maintained at about 97° C. for three hours. During that time the avg. Brookfield Viscosity increased from 60 cps. to about 5000 cps. At this point, the heat was removed and cooling was effected by adding acetone. Analysis indicated the product had an equivalent weight per epoxy group of 280.

56 parts of the acetone solution (25% by weight of acetone to resin) was combined with 17 parts of BF₃ ethylamine (1 phr.) and the solution thoroughly mixed. This mixture was used to prepare a glass cloth laminate using the following conditions:

200 p.s.i.
295° F.
5 minute contact
1 hour 200 p.s.i. at 295° F.

The resulting laminate was very hard and tough and had good elevated temperature strength.

The acetone solution of the new epoxy resin was combined with each of the following as curing agents in place of the BF₃-ethylamine: metaphenylene diamine, diaminodiphenylsulfone and hexahydrophthalic anhydride. The solutions were used to make lamintes using the above-noted conditions. The laminates were very hard and tough and had good elevated temperature strength.

EXAMPLE II

Example I was repeated with the exception that only 1 part of the BF₃ ethylamine per 100 parts of Polyether A was used and the mixture heated to 120° C. for 1 hour. During that time the Brookfield Viscosity increased from 20 cps. to 610 cps. The resulting product was an acetone solution.

EXAMPLE III 100 parts of Polyether A described above was combined with ½ part of BF₃ ethylamine and the mixture heated at 250° F. for 6.5 hours. During that time the Brookfield Viscosity came up to about 400 cps. At the end of the hour, acetone was added to the mixture to cool. The resulting product had an equivalent weight per epoxy group of 280.

The acetone solution prepared above was applied to glass cloth and the solvent flashed for 20 minutes at 120° C. This cloth was then placed in laminate and cured at 200 p.s.i. at 295° F. for contact of 5 minutes. The resulting multi-layer laminate was very strong and hard and had good elevated strength.

EXAMPLE IV

Example I is repeated with the exception that the BF₃ ethylamine is removed from the resulting product by washing with acetone, precipitated with water, dried and dissolved in acetone.

This solution containing 100 parts of the resin is then combined with 10 parts of m-phenylene diamine. The mixture is then used to form a glass cloth laminate as in Example I. The resulting laminate is very hard and tough and has good elevated temperature strength.

EXAMPLE V

About 2000 parts of diglycidyl ether is heated to 97° C. and 40 parts of BF₃-piperidine added thereto. The mixture is stirred and maintained at about 97° C. for several hours. During that time the avg. Brookfield Viscosity increased from 60 up to about 4000 cps. At this point, the solution is cooled as quickly as possible. This product is then dissolved in acetone and 10 parts of the same curing agent are added. The mixture is then used to form a multi-layer laminate as in Example I. The resulting laminate is hard and tough and has good elevated temperature strength.

EXAMPLE VI

About 1000 parts of vinyl cyclohexene dioxide is heated to 60° C. and 20 parts of BF₃-triethanolamine added thereto. The mixture is stirred and maintained at about 80° C. After the avg. Brookfield Viscosity increases 3 to 4 fold, the mixture is cooled quickly by adding acetone. The product is soluble in acetone and analysis indicated the product possesses a plurality of free epoxy groups.

100 parts of the product is mixed with 10 parts additional BF₃-triethanolamine and the mixture heated for several hours. The resulting product is a strong hard casting having good elevated temperature strength.

Related results are obtained by replacing the vinyl cyclohexane dioxide with each of the following: 3,4-epoxy-6 - methylcyclohexylmethyl 3,4-epoxy-6-methylcyclohexanecarboxylate, butadiene diepoxide, diglycidyl phthalate, epoxidized di(cyclohexeneyl)propane and diglycidyl adipate.

EXAMPLE VII

Examples I, II and V are repeated with the exception that 10% by weight of glycerol was included in the cook. The resulting products are soluble epoxy-containing materials which can be subsequently cured with additional BF₃ curing agent to form hard tough castings having good elevated temperature strength.

EXAMPLE VIII

The product produced in Example I is recovered from the acetone solution, chipped into granules and then utilized in the whirlclad type of process. Hot metal objects are dipped into the suspended particles and then withdrawn and cooled. The objects are coated with a small hard insoluble coating of the epoxy material.

I claim as my invention:

1. A process for preparing a high molecular weight epoxy-containing polymer which is made up in its chemical composition of only the basic epoxy-containing monomer used in its preparation as noted hereinafter, is acetone-soluble, is stable in the absence of heat, and is particularly adapted for the formation of heat resistant laminated products, which consists of heating at a temperature between 50° C. and 200° C. a solution consisting of a liquid polyepoxide having a

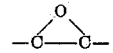

equivalency greater than 1.0 and selected from the group consisting of liquid glycidyl polyethers of polyhydric phenols and polyhydric alcohols, diglycidyl ether, liquid glycidyl esters of polycarboxylic acids, liquid epoxidized esters of unsaturated alcohols and unsaturated monocarboxylic acids, and butadiene diepoxide, said members of the aforementioned group containing the epoxy group as the only group reactive toward the Lewis acid described hereinafter, with not more than 5% by weight of a Lewis acid selected from the group consisting of Friedel-Crafts metal halides, addition products of BF₃ and amines, phenols and ethers until the viscosity of the mixture has increased at least three fold without the occurrence of any gelation, and then rapidly cooling the reaction by addition of a large amount of solvent and thereby stopping the reaction.

2. A process for preparing a high molecular weight epoxy-containing polymer which is made up in its chemical composition of only the basic epoxy-containing monomer used in its preparation as noted hereinafter, is acetone-soluble, is stable in the absence of heat, and is particularly adapted for the formation of heat resistant laminated products, which consists of heating at a temperature between 50° C. and 200° C. a solution consisting of 100 parts of a glycidyl polyether of 2,2-bis(4-hydroxyphenyl)-propane having a molecular weight between 250 and 400, an epoxy equivalency between 1.1 and 2.5 and a melting point no greater than 27° C., with from .1 to 2 parts of a BF₃ amine addition product until the viscosity of the mixture has increased from 8 to 10 fold but without the occurrence of any gelation, rapidly cooling the mixture by addition of a large amount of solvent so as to stop the reaction, and then removing the BF₃ addition product from the reaction mixture.

3. A process for preparing an insoluble infusible heat resistant product which consists of heating at a temperature between 50° C. and 200° C. a solution consisting of a liquid polyepoxide having a

equivalency greater than 1.0 and being selected from the group consisting of liquid glycidyl polyether of polyhydric phenols and polyhydric alcohols, diglycidyl ether, liquid glycidyl esters of polycarboxylic acids, liquid epoxidized esters of unsaturated alcohols and unsaturated monocarboxylic acids, and butadiene diepoxide, said members of the group containing the epoxy group as the only group reactive toward the Lewis acid described hereinafter, with not more than 5% by weight of a Lewis acid selected from the group consisting of Friedel-Crafts metal halides, addition product of $BF_3$ and amines, phenols and ethers, until the viscosity of the mixture has increased at least 3 fold without the occurrence of any gelation and then rapidly cooling the reaction mixture by addition of a large amount of solvent and thereby stopping the reaction, and then adding a curing agent selected from the group consisting of polycarboxylic acids, acid anhydrides, primary and secondary aliphatic, cycloaliphatic and aromatic amines and adducts of these amines and polyepoxides, and heating the mixture until an insoluble infusible product is obtained.

4. A process as in claim 1 wherein the polyepoxide is a glycidyl polyether of 2,2-bis(4-hydroxyphenyl)propane having a molecular weight of about 250 to 400 and an epoxy equivalency between 1.1 and 2.5.

5. A process as in claim 1 wherein the $BF_3$ addition product is $BF_3$-ethylamine.

6. A process as in claim 1 wherein the $BF_3$ addition product is $BF_3$-ethylaniline.

7. A process for preparing an insoluble infusible heat resistant product which consists of heating at a temperature between 50° C. and 200° C. a solution consisting of a liquid polyglycidyl polyether of 2,2-bis(4-hydroxyphenyl)propane, with up to 5% by weight of a $BF_3$ amine addition product until the viscosity has increased at least 3 fold but without the occurrence of any gelation, cooling the mixture by the addition of a large amount of solvent so as to stop the reaction, and then adding from 0.5% to 20% by weight of a $BF_3$ addition product with a member of the group consisting of amines, phenols and ethers, and heating until an insoluble infusible product has been obtained.

References Cited in the file of this patent

UNITED STATES PATENTS

| | | |
|---|---|---|
| 2,717,885 | Greenlee | Sept. 13, 1955 |
| 2,801,229 | De Hoff et al. | July 30, 1957 |
| 2,801,989 | Farnham | Aug. 6, 1957 |
| 2,824,083 | Parry et al. | Feb. 18, 1958 |
| 2,924,580 | Phillips et al. | Feb. 9, 1960 |

OTHER REFERENCES

Lee et al.: "Epoxy Resins," pages 52–53, McGraw-Hill Book Co., Inc., New York, July 31, 1957.